(12) United States Patent
Schwartz

(10) Patent No.: US 10,900,613 B2
(45) Date of Patent: Jan. 26, 2021

(54) DEVICE FOR PROTECTING A HIGH-PRESSURE GAS TANK OF A MOTOR VEHICLE

(71) Applicant: Bayerische Motoren Werke Aktiengesellschaft, Munich (DE)

(72) Inventor: Christophe Schwartz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 256 days.

(21) Appl. No.: 15/444,490

(22) Filed: Feb. 28, 2017

(65) Prior Publication Data

US 2017/0167662 A1 Jun. 15, 2017

Related U.S. Application Data

(63) Continuation of application No. PCT/EP2015/069542, filed on Aug. 26, 2015.

(30) Foreign Application Priority Data

Sep. 2, 2014 (DE) .................. 10 2014 217 515

(51) Int. Cl.
*F17C 13/12* (2006.01)
*F17C 13/04* (2006.01)
(Continued)

(52) U.S. Cl.
CPC ...... *F17C 13/123* (2013.01); *B60K 15/03006* (2013.01); *F17C 13/026* (2013.01);
(Continued)

(58) Field of Classification Search
CPC ......... Y10T 137/1963; Y10T 137/1797; Y10T 137/1632; Y10T 137/1639; F17C 13/04;
(Continued)

(56) References Cited

U.S. PATENT DOCUMENTS 4,085,860 A * 4/1978 Hawkins ................. F16K 17/40
  220/89.4
5,522,428 A * 6/1996 Duvall ............. B60K 15/03006
  137/624.11
(Continued)

FOREIGN PATENT DOCUMENTS

CN  103402746 A  11/2013
CN  203641868 U  6/2014
(Continued)

OTHER PUBLICATIONS

International Search Report (PCT/ISA/210) issued in PCT Application No. PCT/EP2015/069542 dated Jan. 25, 2016 with English translation (seven pages).

(Continued)

*Primary Examiner* — David Colon-Morales
(74) *Attorney, Agent, or Firm* — Crowell & Moring LLP

(57) ABSTRACT

The invention provides a device for protecting a high-pressure gas tank of a motor vehicle. The device includes at least one heat-conducting plate and a thermal triggering unit. The heat-conducting plate has a distal region and a proximal region. The proximal region is arranged immediately adjacent to the thermal triggering unit and the distal region is arranged at a distance from the thermal triggering unit. The heat-conducting plate may be shaped so that it tapers from the distal region to the proximal region. The proximal region itself may be shaped in a tapering fashion. The heat-conducting plate may include heat-conducting fibers.

10 Claims, 5 Drawing Sheets

(51) Int. Cl.
  *F17C 13/02* (2006.01)
  *B60K 15/03* (2006.01)
  *F28F 3/02* (2006.01)
  *F28F 21/08* (2006.01)

(52) U.S. Cl.
  CPC .............. *F17C 13/04* (2013.01); *F28F 3/022* (2013.01); *F28F 21/084* (2013.01); *B60K 2015/03421* (2013.01); *F17C 2201/0104* (2013.01); *F17C 2201/056* (2013.01); *F17C 2203/0604* (2013.01); *F17C 2203/066* (2013.01); *F17C 2203/0619* (2013.01); *F17C 2203/0639* (2013.01); *F17C 2203/0646* (2013.01); *F17C 2203/0663* (2013.01); *F17C 2205/0103* (2013.01); *F17C 2205/0153* (2013.01); *F17C 2205/0332* (2013.01); *F17C 2205/0394* (2013.01); *F17C 2221/011* (2013.01); *F17C 2221/012* (2013.01); *F17C 2221/013* (2013.01); *F17C 2221/031* (2013.01); *F17C 2221/033* (2013.01); *F17C 2223/0123* (2013.01); *F17C 2223/036* (2013.01); *F17C 2250/0439* (2013.01); *F17C 2250/072* (2013.01); *F17C 2260/042* (2013.01); *F17C 2270/0168* (2013.01); *Y02E 60/32* (2013.01); *Y10T 137/1963* (2015.04)

(58) Field of Classification Search
  CPC ............ F17C 13/123; F17C 2201/0104; F17C 2201/056; F17C 2203/0604; F17C 2203/0639; F17C 2203/0646; F17C 2203/066; F17C 2203/0663; F17C 2205/0103; F17C 2205/0332; F17C 2205/0394; F17C 2221/011; F17C 2221/012; F17C 2221/031; F17C 2221/033; F17C 2223/0123; F17C 2223/036; F17C 2260/042; F17C 2270/0168; B60K 15/03006; B60K 2015/03421; F28F 3/022; F28F 21/084; A62C 3/07
  See application file for complete search history.

(56) References Cited

U.S. PATENT DOCUMENTS

| | | | | |
|---|---|---|---|---|
| 5,711,547 | A * | 1/1998 | Blumenthal | B60R 21/264 222/5 |
| 5,848,604 | A * | 12/1998 | Eihusen | F16K 17/383 137/72 |
| 6,382,232 | B1 * | 5/2002 | Portmann | F16K 13/06 102/275.1 |
| 7,721,750 | B2 * | 5/2010 | Lindner | F24J 1/00 137/72 |
| 7,743,785 | B2 * | 6/2010 | Rohwer | F16K 31/002 137/79 |
| 8,038,029 | B2 * | 10/2011 | Lindner | B29C 70/32 220/588 |
| 8,636,165 | B2 * | 1/2014 | Handa | B60K 15/03006 137/79 |
| 2004/0002559 | A1 * | 1/2004 | Troutman | C09D 5/185 524/100 |
| 2005/0087536 | A1 * | 4/2005 | Caudill | F17C 1/14 220/586 |
| 2006/0099366 | A1 * | 5/2006 | Takemoto | B29C 70/088 428/36.1 |
| 2007/0119604 | A1 * | 5/2007 | Thompson | A62C 3/07 169/62 |
| 2007/0267062 | A1 | 11/2007 | Rohwer et al. | |
| 2008/0066805 | A1 * | 3/2008 | Winter | F17C 1/00 137/68.12 |
| 2009/0308874 | A1 | 12/2009 | Lindner et al. | |
| 2011/0079403 | A1 * | 4/2011 | Lee | A62C 2/065 169/62 |
| 2011/0127263 | A1 * | 6/2011 | Lee | F17C 13/12 220/89.2 |
| 2012/0214088 | A1 * | 8/2012 | Breuer | B60K 15/03006 429/515 |
| 2015/0260347 | A1 * | 9/2015 | Noguchi | F17C 13/123 137/468 |

FOREIGN PATENT DOCUMENTS

| | | |
|---|---|---|
| DE | 10 2007 044 189 A1 | 4/2008 |
| DE | 10 2009 024 593 A1 | 4/2010 |
| DE | 10 2011 114 723 A1 | 4/2013 |
| DE | 10 2013 016 036 A1 | 3/2015 |
| DE | 10 2014 213 585 A1 | 1/2016 |
| JP | 2005-315294 A | 11/2005 |

OTHER PUBLICATIONS

German-language Written Opinion (PCT/ISA/237) issued in PCT Application No. PCT/EP2015/069542 dated Jan. 25, 2016 (eight pages).
German Search Report issued in counterpart German Application No. 10 2014 217 515.1 dated May 7, 2015 with partial English translation (12 pages).
Chinese Office Action issued in Chinese counterpart application No. 201580043277.5 dated Jun. 27, 2018, with English translation (Nineteen (19) pages).

* cited by examiner

DEVICE FOR PROTECTING A HIGH-PRESSURE GAS TANK OF A MOTOR VEHICLE

CROSS REFERENCE TO RELATED APPLICATIONS

This application is a continuation of PCT International Application No. PCT/EP2015/069542, filed Aug. 26, 2015, which claims priority under 35 U.S.C. § 119 from German Patent Application No. 10 2014 217 515.1, filed Sep. 2, 2014, the entire disclosures of which are herein expressly incorporated by reference.

BACKGROUND AND SUMMARY OF THE INVENTION

The present invention relates to a device for protecting a high-pressure gas tank of a motor vehicle. High-pressure gas tanks, which are generally also referred to as composite tanks or fiber composite tanks, generally comprise entirely or partially fiber-reinforced material layers which surround a liner. The liner is often formed from aluminum or steel and accommodates the compressed gases such as, for example, compressed air, oxygen, methane, hydrogen, carbonic acid etc. Plastic liners (full-composite tanks) are also known. Such high-pressure gas tanks are used, for example, in vehicles which are operated with Compressed Natural Gas (CNG) or with hydrogen. High-pressure gas tanks also include pressurized cryogenic containers here.

When such high-pressure gas tanks are used, there is the risk of their structure being weakened by the effect of heat. It is known from the prior art to use safety valves, referred to as Thermal Pressure Release Devices (TPRD). These safety valves serve to protect against fire. The design of the safety valves or fire safety valves is specified, for example, by the standard EC79/2009. When there is a direct heat effect on these safety valves (e.g. by flames), the gas which is stored in the high-pressure gas tank is discharged into the surroundings. The safety valves discharge the gas as soon as a minimum temperature at the safety valve is exceeded. The valves are generally arranged at a distance from one another of approximately 1 m along the longitudinal direction of the high-pressure gas tank. The small number of valves along the large pressure tanks can only take into account a spatially highly limited area. A small local flame acting between two valves on the tank can therefore damage the high-pressure gas tank severely without the safety device being activated. The damage to the high-pressure gas tank caused by the heat effect of a local heat source (e.g. a flame), for example the damage to the load-bearing fiber composite material, can cause the high-pressure gas tank to fail and in an extreme case to burst. The high-pressure gas tanks store gases at a pressure of up to 875 bar. Accordingly, the bursting of the high-pressure gas tank can cause very serious damage to the entire vehicle. The fiber composite layers generally bear a major part of the load. The damage to the fiber-reinforced material layer by thermal or mechanical influences can therefore quickly lead to the significant reduction in the durability and to significant weakening of the component.

DE 10 2011 114 723 A1 discloses a device in which a shield plate is arranged underneath the pressurized gas tank. The shield plate includes a hot air duct which has an opening in the region of the thermal triggering unit. If the hot air can be conducted efficiently to the triggering unit, a certain size of duct and a certain rise should be necessary. In addition, the hot air duct should also be closed from below so that the hot air is not deflected by other flows (e.g. head wind, storm, etc.). The device therefore requires a certain installation space. In addition, the geometry is comparatively complex to fabricate and mount, and gives rise to comparatively high costs. If the hot duct itself is damaged or blocked, local generation of heat at a distal point can no longer be reliably detected.

DE 10 2013 016 036 A1 discloses a heat-conducting blow-off line which is not suitable for detecting heat effects acting directly on the tank.

DE 10 2009 024 593 A1 and DE 10 2007 044 189 A1 disclose wound heat-conducting structures. It is disadvantageous that they bear directly on the tank. Owing to the good heat conductivity, the heat would here also be fed directly to the layers to be protected, and these layers would then be damaged.

A preferred object of the technology disclosed here is to reduce or overcome the disadvantages of the previously known high-pressure gas tanks. This and other objects are achieved in accordance with embodiments of the invention.

The technology disclosed here relates to a device for protecting a high-pressure gas tank of a motor vehicle, for example of a vehicle, which can be filled with natural gas or with hydrogen. For example, the high-pressure gas tank described above is used here.

The device comprises at least one heat-conducting plate and a thermal triggering unit. A thermal triggering unit is, for example, the safety valve, also referred to as Thermal Pressure Release Device (TPRD), which is known from the prior art. A heat-conducting plate is a plate, a panel or a layer which is capable of conducting away heat well or particularly well.

For this purpose, materials which are particularly good conductors of heat are used. For example, the heat-conducting panel or the heat-conducting plate can be fabricated from metal, in particular from aluminum.

The heat-conducting plate has a distal region and a proximal region. The proximal region is arranged directly adjacent to the thermal triggering unit, while the distal region is arranged spaced apart from the thermal triggering unit. "Adjacent to the thermal triggering unit" means that the proximal region can be arranged bearing directly on the thermal triggering unit and/or slightly spaced apart from the thermal triggering unit. For example, the proximal region can have regions of the heat-conducting plate which are arranged at a distance from the thermal triggering unit of less than approximately 10 cm, preferably of less than approximately 5 cm and particularly preferably of less than approximately 2 cm. The proximal region is, for example, the region in which heat can be efficiently output to the thermal triggering unit via heat radiation and/or heat conduction. The distal region is arranged spaced apart from the thermal triggering unit. This means that the distal region is arranged further away from the thermal triggering unit than the proximal region. A distal region is generally a region in which the thermal triggering unit cannot detect local generation of heat, or can only inadequately detect such local generation of heat, with the result that there is a risk of damage to the high-pressure gas tank. The distal region is connected in a heat-conducting fashion to the proximal region.

The heat-conducting plate is shaped so as to taper from the distal region to the proximal region, at least in certain areas. Alternatively or additionally, the distal region and/or the proximal region are themselves shaped in a tapering fashion, at least in certain areas. In particular, the heat-conducting plate is shaped so as to taper in such a way that the thermal triggering unit which is arranged adjacent to the proximal region detects an increased heat-conducting plate temperature, when compared to the use of a heat-conducting plate with a non-tapered shape, as a result of which the triggering unit can trigger more quickly. In particular, the heat-conducting plate is tapered in such a way that the thermal triggering unit can trigger before the local generation of heat can damage the high-pressure gas tank. A plurality of tapered regions for one or more triggering units can advantageously be provided.

In contrast to the prior art, the technology disclosed here is based on the fact that the temperature of the heat-conducting plate can be influenced by suitable shaping of the heat-conducting plate. The heat conduction is virtually independent of the head wind. The heat-conducting plate also provides higher fail-safe than in the prior art. Furthermore, the heat-conducting plates are easy to fabricate and to mount.

The rise in temperature in the region of the TPRD is predominantly generated by heat conduction. According to a simplified steady-state consideration, the following formula applies to the heat-conducting plate:

$$Q = m^* c^* \Delta T \qquad (1)$$

where Q: the quantity of heat input (e.g. by a fire),
m: the mass,
c: the specific heat capacity, and
$\Delta T$: the rise in temperature.

The heat which is input and the specific heat capacity are constant in the present case. As a result of the tapering of the material in the direction of the thermal triggering unit, the mass decreases in this direction, as a result of which, according to the above formula, the rise in temperature becomes greater as getting closer to the thermal triggering unit. Therefore, the heat can be quickly transported to the thermal triggering unit without a hot air duct.

A heat-conducting plate can be arranged in the longitudinal direction L of the high-pressure gas tank. In addition, a heat-conducting plate can also be arranged in the circumferential direction of the high-pressure gas tank. Orientation in the circumferential direction is appropriate, for example, if a plurality of thermal triggering units are arranged one behind the other in the longitudinal direction L of the high-pressure gas tank. A distal region can in this case be, for example, a region which is arranged opposite a thermal triggering unit in the circumferential direction.

The heat-conducting plate can include heat-conducting fibers. The heat-conducting fibers preferably extend from the distal region to a proximal region and preferably also into the latter. The heat-conducting fibers preferably also extend within the distal and/or proximal region itself. In other words, the heat-conducting plate can be a composite fiber component or composite fiber layer. Metallic fibers, preferably carbon fibers or aluminum fibers or aluminum wires come here as fibers, for example, which are held by a matrix material, e.g. plastic. With such a fiber composite component, it is possible to conduct the heat in a targeted, directed fashion in the longitudinal direction L toward the thermal triggering unit, while the heat conduction in the transverse direction Q, i.e. transversely with respect to the fiber profile, is low. The matrix material itself has comparatively poor heat-conducting properties. Particularly efficient and targeted heat conduction is therefore possible. This aspect of the technology disclosed here is functionally independent of the concept of providing a region which is shaped in a tapering fashion.

However, the fiber density of the heat-conducting plate preferably increases toward the thermal triggering unit. For example, the heat-conducting plate can be shaped in a tapering fashion in the way described above and below. The fibers are then arranged in a converging fashion, that is to say, running toward one another. In addition, the heat-conducting plate can be a fiber composite component with an essentially constant width B in which only the heat-conducting fibers are arranged converging toward the thermal triggering unit.

The heat-conducting plate preferably tapers (independently of whether it is solid material or a fiber composite) by virtue of the fact that the width B of the heat-conducting plate and/or the wall thickness of the heat-conducting plate decreases toward the thermal triggering unit, at least in certain areas. The width B of the heat-conducting plate is the extension in the transverse direction with respect to the longitudinal axis of the heat-conducting plate. The wall thickness denotes the thickness of the heat-conducting plate. The heat-conducting plate preferably has a wall thickness from 0.1 mm to 40 mm, more preferably from 3 mm to 20 mm, and particularly preferably from 6 mm to 15 mm.

The width B in the proximal region can be at least 10%, preferably at least 30% and particularly preferably at least 60% less than that in the distal region D. The width B in the distal region can be calculated from the circumferential diameter in the circumferential region of the pressure tank multiplied by a factor of 0.9 to 1.5, preferably 1.0 to 1.3, and particularly preferably 1.2. The width B in the proximal region can be calculated from the circumferential diameter in the circumferential region of the pressure tank multiplied by a factor of 0.05 to 0.9, preferably 0.05 to 0.75, more preferably 0.05 to 0.25 and particularly preferably 0.1. The heat-conducting plate disclosed here preferably covers at least 50%, more preferably at least 75%, and particularly preferably the entire circumferential area or the entire surface of the pressure tank.

The side edges of the heat-conducting plate preferably run concavely, at least in certain areas, in the longitudinal direction of the heat-conducting plate. The heat-conducting plate can be attached in a thermally insulated fashion to the high-pressure gas tank and/or to the vehicle floor. The heat-conducting plate can have, at least in certain areas, an intumescent metal material and particularly preferably an intumescent aluminum material.

The intumescent metal material and the intumescent aluminum material are described in patent application DE 10 2014 213 585. The content of the technology described in this document, in particular the content of pages 2 to 8 which describe the intumescent metal or aluminum material is herewith also incorporated into this application by reference.

The term intumescence denotes generally expansion or swelling, that is to say, the increase in size of a solid body under the effect of temperature. In fire prevention, the term refers to the swelling or foaming of materials. Intumescent materials therefore increase their volume and decrease their density under a heat effect. In this context, the volume increases significantly beyond the customary amount of thermal expansion, often by a multiple. The physical properties change significantly. For example, an insulating layer is produced as a result of the swelling or foaming. Intumescent metal materials such as intumescent metal foams have the advantage that, compared to other intumescent materials, they have a relatively high heat conductivity in the non-foamed original state. Accordingly, if strong heating, for example as a result of a local flame, occurs locally at one point, this heat is distributed over a relatively large area of the intumescent metal layer. More uniform heating of the intumescent metal material occurs. The distribution of the locally acting heat into the surface initially reduces the speed with which the point at which the heat acts locally is heated. In addition, in the case of a small local heat effect by a small flame, it is already possible for a metal foam to be built up over a large area, which then protects the tank against the local heat effect over a large area. Furthermore, the intumescent metal material can protect the fiber-reinforced metal layers against mechanical effects. The intumescent metal material preferably has a metal powder and a metal hydride, e.g. titanium hydride. The intumescent metal material is more preferably embodied as an intumescent aluminum material. The intumescent aluminum material preferably includes an aluminum alloy and a propellant. For example, the intumescent layer can be embodied as an aluminum alloy with a propellant of titanium hydride. Such aluminum foams expand under a heat effect by, for example, a factor of 4, wherein a foam with a porous structure is produced. In the foamed state, they have, for example, a density of approximately 0.6 g/cm$^3$. The intumescent aluminum material has, in the non-foamed original state, a low density compared to other intumescent metal materials. Other metal hydrides can also be used as the propellant. In addition, besides aluminum, it is also possible to use, for example, copper, zinc, lead or steel/iron.

An intumescent metal material, in particular aluminum, has very good heat-conducting properties. Therefore, the heat can be quickly conveyed from the local heat source F in the distal region to the thermal triggering unit by means of heat conduction. If the thermal triggering unit nevertheless does not open the safety valve in good time, at least the swelling metal material can avoid or delay damage to the high-pressure gas tank. An intumescent material which only begins to swell at comparatively high temperatures is advantageously selected. Therefore, it is possible to ensure that the swelling occurs only in the event of the thermal triggering unit failing to trigger or triggering too late.

The at least one proximal region is preferably connected in a heat-conducting fashion to the at least one thermal triggering unit. That is to say, the proximal region bears directly against the thermal triggering unit.

The heat-conducting plate can run coaxially with respect to the longitudinal axis L of the high-pressure gas tank. The thermal triggering unit or units can be arranged on the circumferential wall of the high-pressure gas tank. The proximal region is advantageously shaped in a tapering fashion. The tapered region can run (e.g. transversely) in the circumferential direction of the high-pressure gas tank. In other words, the tapered region runs transversely with respect to the longitudinal axis L of the high-pressure gas tank. The tapered region can be embodied in a laterally protruding fashion. In other words, the side edge of the heat-conducting plate has a projection in which the tapered region is embodied in a proximal fashion or adjacent to the thermal triggering unit. In addition, a tapering region can also be provided in the longitudinal direction L of the high-pressure gas tank, which region is provided, for example, adjacent to a thermal triggering unit at the valve end of the high-pressure gas tank.

The device can preferably comprise a plurality of heat-conducting plates which are embodied as described above or below. The plurality of heat-conducting plates can be arranged one next to the other and/or one behind the other, and can protect one or more high-pressure gas tanks. In addition, a heat-conducting plate can have a plurality of distal regions and a plurality of proximal regions which are arranged in the way described here to form a plurality of thermal triggering units. For example, a heat-conducting plate can be designed to protect a high-pressure gas tank which has a plurality of thermal triggering units spaced apart from one another on the circumferential wall of the high-pressure gas tank, in the longitudinal direction thereof. The proximal regions are then the regions adjacent to the individual thermal triggering units. The distal regions are then, for example, regions which are arranged in the center between two triggering units or in the circumferential direction at the opposite end. For example, a heat-conducting plate could then have the shape of a plurality of rhombuses arranged in rows with respect to one another. A plurality of heat-conducting plates, as it were, could protect a high-pressure gas tank with a plurality of thermal triggering units.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
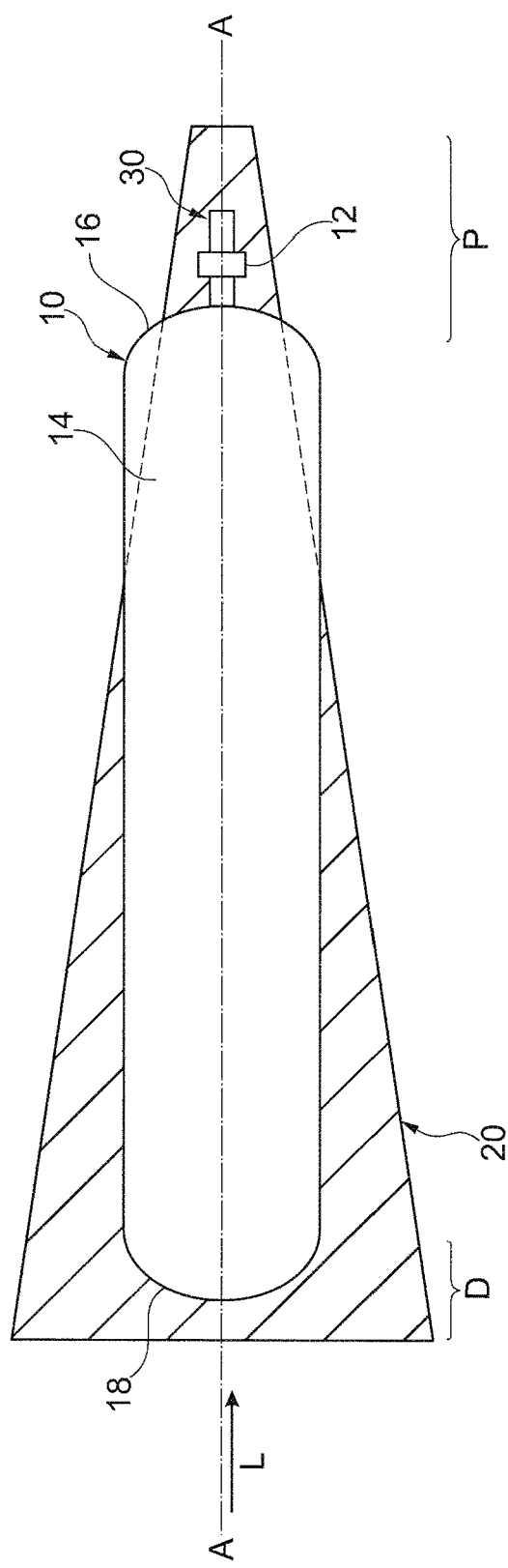
FIG. 1 is a plan view of a high-pressure gas tank and a heat-conducting plate.

A heat-conducting plate 20 which is configured as a triangle in plan view and a high-pressure gas tank 10 are illustrated in FIG. 1. A valve 12 is arranged at the valve end 16 of the high-pressure gas tank 10. In addition, a thermal triggering unit or a TPRD 30 is provided at the valve end 16. The heat-conducting plate 20 covers for the most part the high-pressure gas tank 10. The proximal region P is arranged directly adjacent to the thermal triggering unit 30. Opposite the valve end 16 there is the second end 18 of the high-pressure gas tank 10. The heat-conducting plate 20 also ends in the region of the second end 18. By way of example, the distal region D is illustrated in this end region of the heat-conducting plate 20. The heat-conducting plate 20 illustrated here tapers continuously toward the thermal triggering unit 30. The heat-conducting plate 20 projects here in the longitudinal direction L of the high-pressure gas tank 10 beyond the thermal triggering unit 30. The reference number 14 shows the circumferential wall of the high-pressure gas tank 10, which wall extends between the two ends 16, 18.

Figure 2:
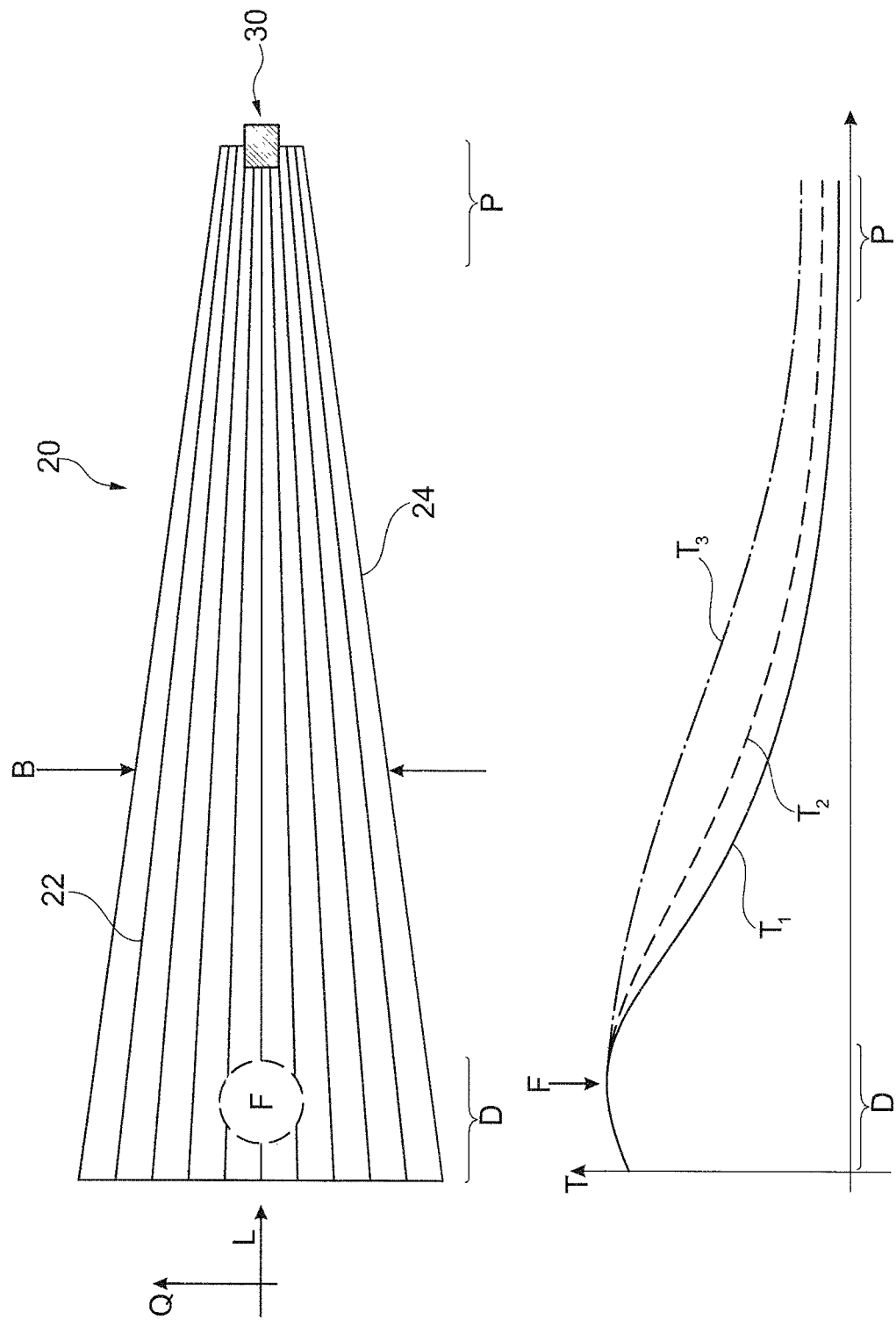
FIG. 2 is a plan view of a heat-conducting plate and a thermal triggering unit along with a schematic temperature profile.

FIG. 2 shows a heat-conducting plate 20 and a thermal triggering unit 30 in a schematic plan view. The individual heat-conducting fibers 22 here run toward one another continuously in a tapering fashion in the direction of the thermal triggering unit 30. Therefore, the fiber density increases gradually toward the thermal triggering unit 30. The heat-conducting plate 20 is embodied in a tapering fashion in the proximal region P and in the distal region D. In addition, the region between the proximal region P and the distal region D is also embodied in a tapering fashion. Besides this preferred embodiment, it is also possible to embody a heat-conducting plate 20 with heat-conducting fibers 22, where the plate has a constant or essentially constant width B. The fibers which run in the axial direction L pass on well in the longitudinal direction L the quantity of heat which has been input by a local heat source F. In the transverse direction Q, which is perpendicular with respect to the fiber profile, the heat is, however, passed on only slowly. Therefore, a comparatively large part of the quantity of heat which is input by the local heat source F arranged in the distal region D can be passed on to the thermal triggering unit 30.

The temperature profile T1 which is illustrated by solid lines shows schematically the temperature profile which is obtained for a rectangular panel with isotropic heat-conducting properties. The temperature profile T2 which is illustrated by dashed lines shows schematically the temperature profile of a rectangular heat-conducting plate with heat-conducting fibers which extend from the distal region to the proximal region. A similar profile is achieved if a heat-conducting plate is used which has tapered regions, as shown, for example, in FIGS. 1 and 3 to 5. The temperature profile T3 shows schematically the temperature in a heat-conducting plate with heat-conducting fibers which are also embodied in a tapering fashion (cf. FIG. 2). All of the three temperature profiles are based on the fact that in the distal region D, a constant quantity of heat is input continuously by the local heat source F.

It is clearly apparent that the heat-conducting plates which are disclosed here generate higher temperatures at the thermal triggering unit or units than rectangular heat-conducting plates 20 with isotropic heat-conducting properties. The fiber composite component which is embodied in a tapered fashion has temperatures in the proximal region P which are increased once more by the heat-conducting fibers 22 which are compressed in the direction of the thermal triggering unit 30.

Figure 3:
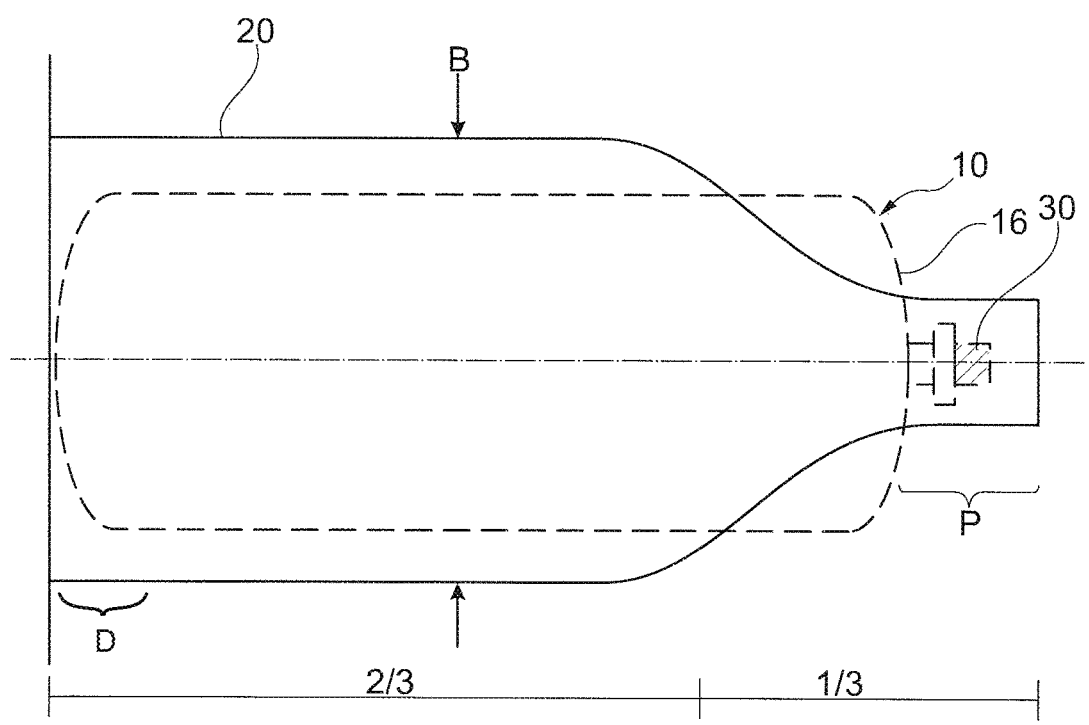
FIGS. 3-5 are views of a high-pressure gas tank and a heat-conducting plate having a contour different from FIG. 1.

FIG. 3 shows schematically a high-pressure gas tank 10, a heat-conducting plate 20 and a thermal triggering unit 30. In contrast to FIGS. 1 and 2, the heat-conducting plate 20 has a different contour here. Instead of continuously tapering linearly from one end to the other end, the heat-conducting plate 20 has an approximately constant width B in the distal region D here. For example, it has been assumed here that two thirds of the total length of the heat-conducting plate 20 have an essentially constant width B. In this example, the high-pressure gas tank 10 also has a thermal triggering unit 30 at the valve end 16. A third of the heat-conducting plate 20 which is arranged in the vicinity of the valve end 16 and comprises the proximal region P has the tapering section. The width B of the heat-conducting plate 20 decreases continuously in this tapered region. The proximal region P itself has an essentially constant width B in the example illustrated here. The shape of the heat-conducting plate 20 can assume any tapering shape which permits the detection of a local heat source. If a local heat source acts on the high-pressure gas tank 10 in the first third, the thermal triggering device 30 will already detect this solely on the basis of the heat radiation of the heat source. Depending on the design of the thermal triggering unit and the other components, the tapered region can also be configured differently. The basic concept here is that in distal regions D in which the thermal triggering unit 30 can no longer reliably trigger on the basis of the direct heat radiation of the local heat source F, the quantity of heat which is applied by the local heat source F is made available by means of heat conduction by the heat-conducting plate 20 of the thermal triggering unit 30. Other shapes in addition to the bottle-shaped design shown here and the triangular designs shown in FIGS. 1 and 2 are also conceivable.

Figure 4:
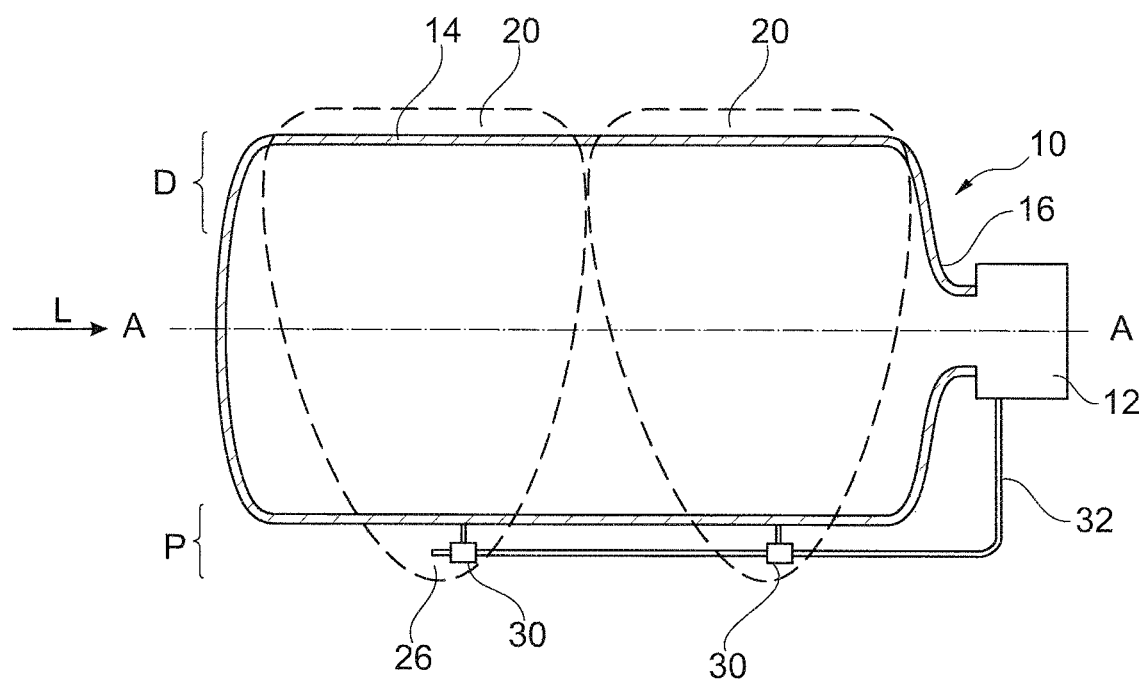

FIG. 4 shows schematically a plan view of a high-pressure gas tank 10 and of two heat-conducting plates 20 which are arranged here in the circumferential direction around the high-pressure gas tank 10. The high-pressure gas tank 10 has at the valve end 16 a valve 12 from which a line 32 extends counter to the longitudinal direction L of the tank 10. Two thermal triggering units 30 are arranged spaced apart from one another on the circumference 14 of the high-pressure gas tank 10. The heat-conducting plates 20 taper from the distal region D toward the proximal region P. The heat-conducting plates 20 which are shown by dashed lines are also embodied in a tapering fashion within the proximal region P. If a heat source then acts on the high-pressure gas tank 10 locally in the distal region D, the thermal triggering units 30 can trigger comparatively early thanks to the tapering shape of the heat-conducting plates 20. If, for example, a local heat source acts below the line of symmetry A-A on the high-pressure gas tank 10, the thermal triggering units 30 can detect at least partially in a direct fashion the heat radiation of the local heat source. The triggering devices then, under certain circumstances, can trigger so quickly that the fibers are not damaged. For this reason, it may not be necessary for the high-pressure gas tank 10 to be covered completely by the heat-conducting plate 20.

Figure 5:
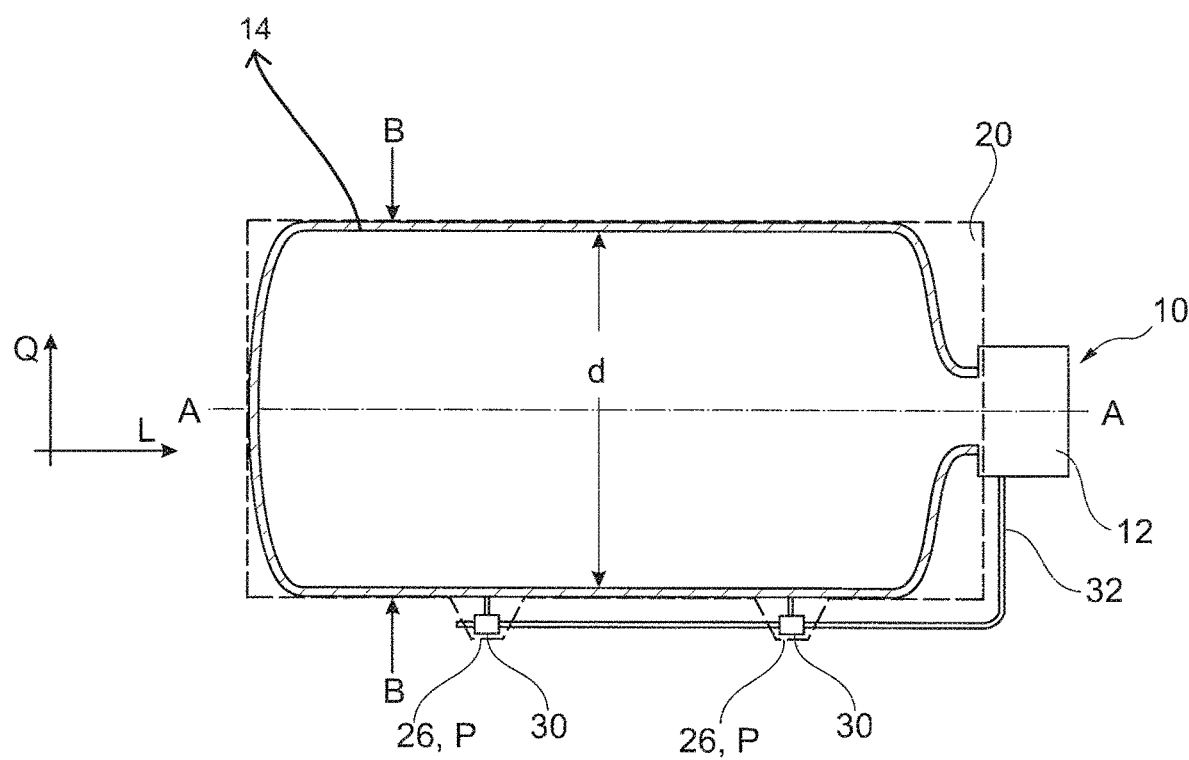

FIG. 5 shows a schematic plan view of a high-pressure gas tank 10 and a heat-conducting plate 20. The heat-conducting plate 20 has an essentially constant width B in the longitudinal direction L of the high-pressure gas tank 10. The width B corresponds here essentially to the diameter d of the circumferential wall 14. However, this does not have to be the case. The heat-conducting plate 20 can also have a different width B. The proximal region P adjacent to the thermal triggering units 30 which are arranged on the circumferential wall 14 is embodied in a tapering fashion in this exemplary embodiment. This tapered region 26 tapers in the circumferential direction or in the direction Q transversely with respect to the longitudinal direction L of the high-pressure gas tank 10. The tapered regions 26 which are shown here can be embodied in a laterally protruding fashion. This means that the heat-conducting plate 20 has lateral projections (i.e. tapered regions 26) which have an essentially constant width B and are embodied in a tapering fashion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A device for protecting a high-pressure gas tank of a motor vehicle, comprising:
   at least one heat-conducting plate; and
   a thermal triggering unit, wherein
   the heat conducting plate has a distal region and a proximal region,
   the proximal region is disposed directly adjacent to the thermal triggering unit,
   the distal region is disposed spaced apart from the thermal triggering unit,
   the heat-conducting plate is shaped so as to taper from the distal region to the proximal region, and
   the heat-conducting plate at least in a region extends beyond a circumferential wall of the high-pressure gas tank.

2. The device according to claim 1, wherein the heat-conducting plate includes heat-conducting fibers,
the heat-conducting fibers extend from the distal region to the proximal region, and
the heat-conducting plate is attached in a thermally insulated fashion to the high-pressure gas tank.

3. The device according to claim 1, wherein the heat-conducting plate tapers such that a width or a wall thickness of the heat-conducting plate, in at least one area of the heat-conducting plate, decreases toward the thermal triggering unit.

4. The device according to claim 3, wherein the width in the proximal region is at least 10% less than the width in the distal region.

5. The device according to claim 3, wherein the width in the proximal region is at least 60% less than the width in the distal region.

6. The device according to claim 1, wherein the heat-conducting plate has side edges which run concavely, in at least, one area of the heat-conducting plate, in a longitudinal direction of the heat-conducting plate.

7. The device according to claim 1, wherein the heat-conducting plate is attached, in a thermally insulated fashion, to the high-pressure gas tank.

8. The device according to claim 1, wherein the device is configured in such a way that a heat of a local heat source acting on the high-pressure gas tank in the distal region is passed on to the thermal triggering unit.

9. The device according to claim 1, wherein the heat-conducting plate is shaped so as to taper continuously from the distal region to the proximal region, wherein the distal region is disposed at a first end of the heat-conducting plate, wherein the proximal region is disposed at a second end of the heat-conducting plate, and wherein the first end is opposite from the second end.

10. The device according to claim 1, wherein the proximal region of the heat-conducting plate projects in a longitudinal direction of the high-pressure gas tank beyond the thermal triggering unit.

\* \* \* \* \*